(12) United States Patent
Brenner et al.

(10) Patent No.: US 6,528,612 B1
(45) Date of Patent: Mar. 4, 2003

(54) HIGHLY BRANCHED POLYCONDENSATES

(75) Inventors: Axel Brenner, Düsseldorf (DE); Annett König, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/937,190

(22) PCT Filed: Mar. 15, 2000

(86) PCT No.: PCT/EP00/02284

§ 371 (c)(1),
(2), (4) Date: Sep. 21, 2001

(87) PCT Pub. No.: WO00/58385

PCT Pub. Date: Oct. 5, 2000

(30) Foreign Application Priority Data

Mar. 25, 1999 (DE) .......................................... 199 13 533

(51) Int. Cl.$^7$ .............................................. C08G 63/00
(52) U.S. Cl. ........................................ 528/271; 528/272
(58) Field of Search .................................. 528/271, 272

(56) References Cited

U.S. PATENT DOCUMENTS

| | | | |
|---|---|---|---|
| 3,544,514 A | 12/1970 | Schnell et al. .................. | 260/47 |
| RE27,682 E | 6/1973 | Schnell et al. .............. | 260/47 X |
| 4,185,009 A | 1/1980 | Idel et al. ............... | 260/45.9 R |
| 4,550,155 A | 10/1985 | Jones et al. ................... | 528/176 |
| 5,064,914 A | 11/1991 | Rosenquist et al. .......... | 525/439 |
| 5,928,709 A | 7/1999 | Doenges et al. ............ | 427/2.14 |
| 5,998,565 A | * 12/1999 | de Brabander-van den Berg et al. ..... | 528/176 |

FOREIGN PATENT DOCUMENTS

| | | |
|---|---|---|
| GB | 1159924 | 7/1969 |
| WO | 95/06081 | 3/1995 |

* cited by examiner

*Primary Examiner*—Terressa M. Boykin
(74) *Attorney, Agent, or Firm*—Joseph C. Gil; Aron Preis; James R. Franks

(57) ABSTRACT

A highly branched polycondensate is described. The polycondensate is prepared by polycondensating (a) monomers capable of polycondensation in the presence of (b) branching agents, wherein the branching agents are selected from polymers, oligomers consisting of 2 to 100 monomer units and dendritic polymers. The branching agents contain residues of monomers represented by the general formulas, $$A-R-B_x \text{ or } A_x-R-B$$

wherein

A represents a —C(O)X group, X being hydroxyl, halogen, alkoxy or aralkoxy, each having 1 to 30 carbon atoms, B represents one of (i) an —OY group, Y being hydrogen, trialkyl silyl, alkyl or acyl, each having 1 to 30 carbon atoms, and (ii) an amino group, an ammonium halide or an alkyl carbamate having 1 to 8 carbon atoms, R is an organic aromatic, aliphatic-aromatic or aliphatic radical containing 1 to 25 carbon atoms, and $x \geq 2$.

Also described are molded articles prepared from the highly branched polycondensate of the present invention.

8 Claims, No Drawings

HIGHLY BRANCHED POLYCONDENSATES

CROSS REFERENCE TO RELATED PATENT APPLICATIONS

The present patent application claims the right of priority under 35 U.S.C. 119 (a)–(d) and 35 U.S.C. 365 of International Application No. PCT/EP00/02284, filed Mar. 15, 2000, which was published in German as International Patent Publication No. WO 00/58385 on Oct. 5, 2000, which is entitled to the right of priority of German Patent Application No. 199 13 533.9, filed Mar. 25, 1999.

FIELD OF THE INVENTION

The invention relates to highly branched polycondensates and to a process for producing them.

BACKGROUND OF THE INVENTION

Branched polycondensates have proven to be particularly suitable for certain applications. Thus, it is known that branched polycarbonates are distinguished by much higher pseudoplasticity than linear polycarbonates; this means that the apparent melt viscosity decreases as the shear rate increases. Polycarbonates with better pseudoplasticity or pronounced non-Newtonian flow behaviour have good processing properties during both extrusion and injection moulding.

Low-molecular branching agents are used for producing branched polycarbonates. These include, for example, phloroglucinol (DE 15 70 533 A), isatinbiscresol (DE 25 00 092 A), trimellitic acid (EP 140 341 A) and tris-1,1,1-(hydroxyphenyl)-ethane (EP 708 143 A). A drawback of the branched polycarbonates produced using low molecular branching agents is a relatively broad molecular weight distribution, i.e. a high degree of dispersion, and the fact that the molecular weight achieved is not sufficiently high or the branched polycarbonates tend to crosslink. This adversely affects the flow behaviour and therefore the processing properties of the polycarbonates. The transparency of the branched polycarbonates is also impaired by the formation of gel bodies.

For producing branched polycarbonates, it is basically known to use polymers as branching agents. However, this procedure is not usually recommended as the use of polymeric branching agents often leads to increased formation of gel bodies and the pseudoplasticity in the resultant polymer is relatively weakly pronounced because the polymeric branching agents have a high melt viscosity and are usually poorly soluble in other polymers. A further drawback of polymeric branching agents is that a large proportion of the chemical functionalities resides inside the statistical coil and can only be accessed for chemical reactions with difficulty or with a prolonged reaction time.

SUMMARY OF THE INVENTION

It is the object of the invention to prepare branched thermoplastic polycondensates with pronounced pseudoplasticity, which do not have the aforementioned drawbacks.

This object is achieved by highly branched polycondensates which can be obtained by polycondensation of monomers capable of polycondensation in the presence of branching agents, wherein the branching agents are polymers, oligomers consisting of 2 to 100 monomer units or dendritic polymers and are made up of monomers of the general formulae A—R—$B_x$ or $A_x$—R—B, wherein A represents a COX group and X is hydroxyl, halogen, preferably chlorine, alkoxy or aralkoxy, each having 1 to 30, preferably 1 to 20 or 1 to 8 carbon atoms and wherein B represents an OY group and Y is hydrogen, trialkyl silyl, alkyl or acyl, each having 1 to 30, preferably 1 to 20 or 1 to 8 carbon atoms or wherein B is an amino group, an ammonium halide, preferably ammonium chloride, or an alkyl carbamate having 1 to 8 carbon atoms, preferably t-butylcarbamate, R is an organic aromatic, aliphatic-aromatic or aliphatic radical containing 1 to 25 carbon atoms and $x \geq 2$.

These polycondensates are, for example, polycarbonates and copolycarbonates, polyesters, polyamides, polyesteramides and copolycondensates containing at least two of the aforementioned polymer units.

Polycarbonates and copolycarbonates according to the invention are highly transparent, have a very light inherent colour and are distinguished by excellent stability of the melt and pronounced pseudoplasticity. The polycarbonates according to the invention obtained by using dendritic macromolecular branching agents preferably contain less than 600 ppm of terminal OH groups. The highly branched polycarbonates have average molecular weights $\overline{M}_w$ of 8,000 to 80,000, preferably 12,000 to 40,000, which are determined by measuring the relative solution viscosity in dichloromethane or in mixtures of identical quantities by weight of phenol and o-dichlorobenzene, the measuring system being calibrated by light scattering.

Dendritic polymers in the sense of the invention include so-called highly branched polymers and so-called dendrimers. Both categories of polymer are known and described, for example, in A. Brenner "Hochverzweigte Strukturen auf der Basis von Polyestern und Polyamiden", Herbert Utz-Verlag Wissenschaft, Munich (1996). The dendritic polymers are thermoplastics, for example polyesters or polyamides, and act as branching agents during polycondensation. The use of dendritic branching agents allows the production of polycondensates with interesting properties.

The use of dendritic branching agents and the polymeric products obtainable thereby are described hereinafter in the example of polycarbonates.

The highly branched polymers used as branching agents for producing the polycarbonates according to the invention are known and are generally distinguished by extremely low solution viscosity, extremely good solubility in comparison with their linear analogues, an approximately globular structure of the polymer molecules and a high number of functional groups on the surface of the polymeric spherulites. Owing to their particular properties, highly branched polymers can be used as branching agents for producing branched polycarbonate, without leading to the usual drawbacks of known polymeric branching agents.

DETAILED DESCRIPTION OF THE INVENTION

For example, the highly branched polyesters from U.S. Pat. No. 3,669,939 can be used as branching agents. U.S. Pat. No. 3,669,939 discloses highly branched polymers obtained by condensation of polyhydroxy monocarboxylic acids of formula $(OH)_nR$—COOH, wherein n is an integer from 1 to 6 and R is a hydrocarbon radical having 1 to 22 carbon atoms and/or —$CH_2OH$. For obtaining the highly branched polymer structure, it is essential that A-functionalities are able to react only with B-functionalities.

According to a particular embodiment of the invention, the branching agents used according to the invention can be obtained from monomers of formula

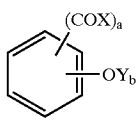 (I)

wherein X is hydroxyl, halogen, alkoxy or aralkoxy and Y is hydrogen, trialkyl silyl, alkyl or acyl and a is equal to 1 and b≧2 or a≧2 and b is equal to 1; or

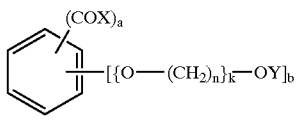 (II)

wherein X, Y, a and b are as defined above and n and k, independently of one another, is an integer from 1 to 10; or

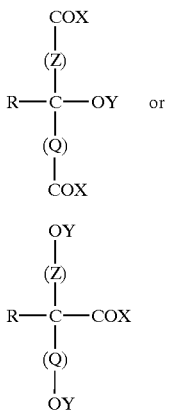

(III) and (IV)

wherein X and Y are as defined above, R is hydrogen, alkyl or aralkyl and Z and Q, independently of one another, are optionally substituted alkyl, aryl or aralkyl.

Suitable monomers and their production are described, for example, in the above-mentioned document by A. Brenner "Hochverzweigte Strukturen auf der Basis von Polyestern und Polyamiden", Herbert Utz-Verlag Wissenschaft, Munich 1996, pages 29to 32, 43 to 46 and 123 to 130.

Monomers of the following formulae (1) to (5) have proven particularly suitable for producing polyesters with highly branched polymer structure.

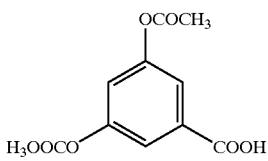 (1)

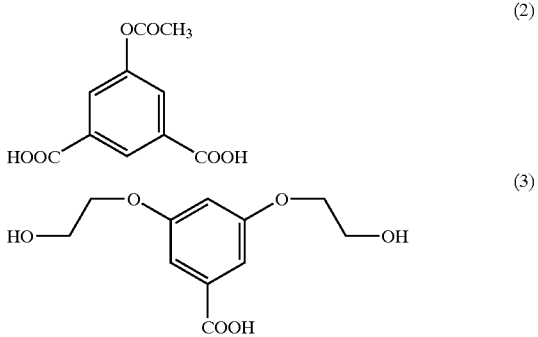

(2) and (3)

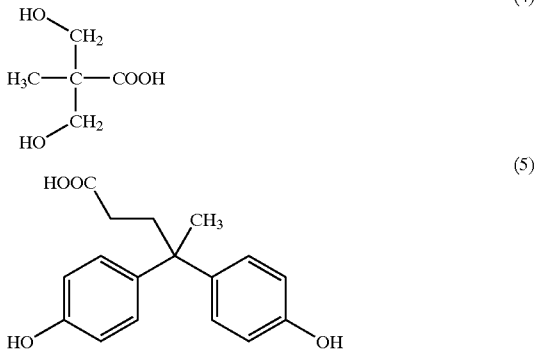

(4) and (5)

The highly branched polymers may be modified by addition of comonomers during the polycondensation reaction.

Dendrimeric polymers, in particular dendrimeric polyesters, as branching agents with a globular, perfectly branched macromolecular structure and hydroxyl functionalities on their surface may be obtained in accordance with WO 93/18079, reference being made to the disclosure thereof.

Pseudoplastic branched polycarbonates are produced by the so-called melt transesterification process in which bisphenols and carboxylic acid diesters are reacted in a known manner at temperatures of 80 to 400° C., preferably to 320° C., in the presence of a catalyst and a branching agent and the polycarbonate is obtained in a known manner, the above-mentioned polymers with a dendritic or highly branched polymer structure being used as branching agents.

For producing the branched polycarbonates, the branching agents to be used according to the invention are used in quantities of 0.05 to 2.0%, preferably 0.25 to 1.5% by mass, based on the mass of the bisphenol.

Bisphenols suitable for producing the branched polycarbonates according to the invention are those of general formula HO—Z—OH, wherein Z represents a divalent radical preferably having 6 to 40 carbon atoms and includes mono- and poly-nuclear bisphenols optionally also containing hetero atoms with substituents which are optionally inert under the conditions of polycarbonate production and the thermal processing thereof.

Suitable bisphenols include, for example, hydroquinone, resorcinol, bis-(hydroxyphenyl)-alkanes, bis-(hydroxyphenyl)-cycloalkanes, bis-(hydroxyphenyl)-sulphides, -ether, -sulphoxide, -sulphone and αα-bis-(hydroxyphenyl)-diisopropylenebenzenes and the ring-alkylated and ring-halogenated compounds thereof. Suitable bisphenols are described, for example, in U.S. Pat. Nos. 3,028,365, 2,999,835, 3,062,781, 3,148,172, 4,982,014, DE 15 70 703 A and DE 20 63 050 A and also in H. Schnell "Chemistry and Physics of Polycarbonates", Interscience Publishers, New York, 1964.

Preferred bisphenols include 4,4'-dihydroxydiphenyl,
2,2-bis-(4-hydroxyphenyl)-propane,
2,4-bis-(4-hydroxyphenyl)-2-methylbutane,
1,1-bis-(hydroxyphenyl)-cyclohexane,
αα-bis-(4-hydroxyphenyl)-p-diisopropylbenzene,
αα-bis-(4-hydroxyphenyl)-m-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane,
α,α-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane
1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-1-phenyl-ethane,
2,2-bis-(3,5-dimethyl-4-hydroxyphenyl)-2-phenyl-ethane
2,2-bis-(4-hydroxyphenyl)-1,2-diphenylethane,
9,9-bis-(4-hydroxyphenyl)-fluorene,
9,9-bis-(3,5-dimethyl-4-hydroxyphenyl)-fluorene.

Particularly preferred bisphenols are
2,2-bis-(4-hydroxyphenyl)-propane,
2,2-bis-(3,5-dimethyl-4-hydroxyphenyl)-propane,
1,1-bis-(4-hydroxyphenyl)-cyclohexane,
1,1-bis-(4-hydroxyphenyl)-1-phenyl-ethane,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-4-methylcyelohexane,
9,9-bis-(3,5-dimethyl-4-hydroxyphenyl)-fluorene.

Quite particularly preferred bisphenols are
2,2-bis-(4-hydroxyphenyl)-propane,
1,1-bis-(4-hydroxyphenyl)-3,3,5-trimethylhexane and
1,1-bis-(4-hydroxyphenyl)-1-phenyl ethane.

Carboxylic diesters, preferably carboxylic acid $C_6$–$C_{14}$ aryl esters, preferably the diesters of phenol or alkyl-substituted phenols such as diphenyl carbonate or dicresyl carbonate may be used for producing the polycarbonates according to the invention. Carboxylic diesters are preferably used in quantities of 1.01 to 1.30 mol, in particular 1.02 to 1.15 mol, based on 1 mol bisphenol.

Ammonium and phosphonium catalysts, of the type described in U.S. Pat. No. 3,442,863, JP-A 14 7422, U.S. Pat. No. 5,399,659 or guanidine systems, of the type described in U.S. Pat. No. 5,319,066, may be used as transesterification catalysts. They are preferably used in quantities of $10^{-8}$ to $10^{-4}$ mol, particularly preferably in a concentration of $10^{-6}$ to $10^{-5}$ mol, based on 1 mol diphenol.

Preferred catalysts, in particular for producing oligocarbonates as intermediate product for producing the branched polycarbonates, include compounds of general formulae (V) and (VI):

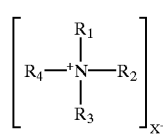

(V)

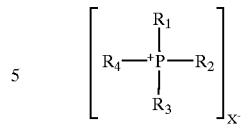

(VI)

wherein $R_1$ to $R_4$ which may be same or different, represent a $C_1$–$C_6$ alkyl radical, $C_6$–$C_{12}$ aryl radical or $C_5$–$C_6$ cycloalkyl radical and X- is an anion having a p$K_B$ value lower than 11 as Brönsted base.

Preferred catalysts therefore include tetramethyl ammonium tetraphenylboranate, tetraphenyl phosphonium phenolate, tetraphenyl phosphonium fluoride, tetraphenyl phosphonium tetraphenylboranate, dimethyldiphenyl ammonium hydroxide, tetraethyl ammonium hydroxide, tetraethyl ammonium hydroxide, tetramethyl ammonium hydroxide, tetramethyl ammonium acetate, tetramethyl ammonium fluoride, imidazole.

Two or more catalysts may also be used in combination. It is possible to add these catalysts again after oligocarbonate synthesis during polycondensation in the second stage.

Alkali metal catalysts or alkaline-earth metal catalysts may also be used in addition to these catalysts. The alkali metal catalysts or alkaline-earth metal catalysts, for example according to U.S. Pat. No. 3,272,601, are preferably used in quantities of $10^{-8}$ to $10^{31\ 4}$ mol, based on 1 mol bisphenol, particularly preferably in a concentration of $10^{-7}$ to $10^{-5}$ mol, based on 1 mol bisphenol. These are, for example, the hydroxides, carbonates, halides, phenolates, diphenolates, fluorides, acetates, phosphates, hydrogen phosphates or boranates of lithium, sodium, potassium, caesium, calcium, barium and magnesium.

The alkali metal catalyst or alkaline-earth metal catalyst can be introduced into the oligocarbonate or into the polycarbonate, for example, as a solid or a solution in water or in an organic solvent such as phenol.

If high-purity polycarbonates are required, for example for producing data carriers, reaction components with a minimum content of alkali ions and alkaline-earth ions are used. These high-purity carboxylic acid diaryl esters or bisphenols may be obtained, for example, by recrystallisation, washing or distillation. The content of alkali/alkaline-earth metal ions in both the bisphenol And the carboxylic acid diester should preferably be lower than 0.01 ppm. Furthermore, polycarbonate production should preferably be controlled in such a way that as few impurities as possible are dragged into the product. The content of residual monomers (bisphenols) in the polycarbonate and in the products produced therefrom should preferably be as low as possible, preferably lower than 10 ppm.

The process according to the invention may be carried out in one stage, the starting compounds, bisphenol And carboxylic acid diester, being reacted under the polycondensation conditions known from the literature. The starting compounds are melted at temperatures of 80 to 250° C., preferably 100 to 230° C., particularly preferably 120 to 190° C., under normal pressure in a period of up to 5 hours, preferably 0.25 to 3 hours. The transesterification catalyst and optionally the branching agent may be added prior to or after melting of the starting compounds. An oligocarbonate is obtained by applying a vacuum, raising the temperature and distilling off the monophenol. Polycondensation is continued after addition of the branching agent by a further rise in the temperature to 240 to 400° C. and a reduction in the pressure to 0.01 mbar until a high-molecular, soluble branched polycarbonate is obtained.

Polycondensation may take place in two or more stages, repeated addition of catalyst possibly being advantageous in the condensation step for polycarbonate production. Addition of the branching agent may advantageously also be delayed to the oligocarbonate stage.

If polycondensation takes place in stages, oligocarbonates with average molecular weights $\overline{M}_w$ of 3,000 to 24,000, preferably 5,000 to 20,000 are initially produced with addition of transesterification catalysts. The temperature for oligocarbonate production is 100 and 290° C., preferably 150 and 280° C. The monophenols formed during transesterification to oligocarbonate are removed by applying a vacuum of 0.5 to 500 mbar. Polycondensation of the oligocarbonate is completed by addition of branching agents and optionally by further addition of catalyst and by raising the temperature to 230 to 400° C., preferably 250 to 320° C., at a pressure of 100 mbar to 0.01 mbar.

Low-volatility phenols such as cumyl phenol or 4-phenyl phenol, preferably in quantities of 0.01 to 10 mol % per mol bisphenol Are used to limit the weight-average molecular masses $\overline{M}_w$ of the polycarbonates.

For special applications, the polycondensates may be modified by condensation of blocks, segments and comonomers. Siloxane blocks with terminal hydroxyl groups, aromatic and aliphatic polyesters with terminal hydroxyl and carboxyl groups, polyphenylene sulphide blocks with terminal OH groups or polyphenylene oxide blocks with terminal hydroxyl groups are mentioned by way of example.

The process according to the invention may be carried out in mixing tanks, thin-film vaporisers, falling film vaporisers, mixing tank cascades, extruders, kneaders, simple disc reactors and disc reactors for high-viscosity products.

The polycondensates obtained according to the invention may be converted in a known manner to pellets which are used for producing polycondensate moulding compositions and for conversion to moulded articles.

The moulding compositions containing the polycondensates, in particular polycarbonates, produced according to the invention, may also be blended with unbranched polycarbonates or other thermoplastic polymers such as polyolefins, polyesters, polyamides, polystyrene and blends based on acrylonitrile/butadiene/styrene copolymers.

The moulding compositions according to the invention may contain suitable additives such as mould release agents, UV absorbers, stabilisers, lubricants, antistatic agents, fillers and/or reinforcing materials, anti-oxidants, pigments, dyes and finely divided minerals. The additives are incorporated into the amorphous thermoplastic polymer in a known manner by mixing polymer pellets with the additives and subsequent extrusion or mixing of the solutions of the polymer with solutions of the additives and subsequent evaporation of the solvent in a known manner. The proportion of additives in the moulding composition may be varied in wide limits and is based on the desired properties of the moulding composition. The total content of additives in the moulding composition is up to about 20 wt. %, preferably 0.5 to 5 wt. %, based on the weight of the moulding composition.

Examples of mould release agent include calcium stearate, zinc stearate, glycerine monostearate and pentaerythritol tetrastearate; glycerine monostearate and pentaerythritol tetrastearate are preferred mould release agents.

UV absorbers may be added to the moulding compositions, particularly if they are used for producing mouldings such as windows or panels for the building industry. Compounds which, owing to their absorbency of below 400 nm, are capable of effectively protecting polycarbonate from UV light and have a molecular weight higher than 370, preferably of 500 and higher are suitable UV absorbers. Triazines such as 2,4-bis-(2,4-dimethylphenyl)-6-(2-hydroxy-4-n-octylphenyl)-1,3,5-trianzine (CYASORB® UV-11649) or 2-(4,6-diphenyl-1,3,5-triazin-2-yl)-5-(hexyl)oxyphenol (TINUVIN® 1577) are mentioned by way of example.

Stabilisers suitable for amorphous thermoplastic polymers include, for example, stabilisers containing phosphines, phosphites or silicon as well as other compounds described in EP 0 500 496 A1. Triphenylphosphites, diphenylalkylphosphites, phenyldialkylphosphites, tris-(nonylphenyl)-phosphite, tetrakis-(2,4-di-tert.-butylphenyl)-4,4'-biphenylene-diphosphonite and triphenylphosphite are mentioned by way of example.

Examples of lubricants include hydrocarbons (for example paraffin oils, polyethylene waxes), alcohols (for example stearyl alcohol), carboxylic acids (for example lauric acid, palmitic acid, stearic acid), carboxylamides (for example stearic acid amide, ethylene diamine bisstearyl amide), carboxylic acid esters (for example n-butyl stearate, stearyl stearate, glycerine monostearate, glycerine tristearate, pentaerythritol tetrastearate); carboxylamides and carboxylic acid esters are preferred lubricants.

Examples of antistatic agents include cationic compounds (for example quaternary ammonium, phosphonium or sulphonium salts), anionic compounds (for example alkyl sulphonates, alkyl sulphates, alkyl phosphates, carboxylates in the form of alkali or alkaline-earth metal salts), non-ionic compounds, for example polyethylene glycol esters, polyethylene glycol ethers, fatty acid esters, ethoxylated fatty amines); non-ionic compounds are preferred antistatic agents.

Preferred fillers include glass beads, mica, silicates, quartz, talcum, titanium dioxide or Wollastonite. Glass or carbon fibres are preferred reinforcing materials.

The moulding compositions according to the invention may be produced by mixing the respective constituents in a known manner and by compounding or extruding the melt at temperatures of about 200° C. to 330° C. in conventional units such as internal kneaders, extruders and twin screws.

The individual constituents may be mixed in a known manner both in succession and simultaneously, at both ambient temperature and elevated temperature.

The polycarbonates according to the invention are suitable for both extrusion and injection moulding. Owing to the excellent stability of the extrudate, they are also suitable for the production of hollow bodies by the blow-moulding process. The excellent pseudoplastic properties allow, for example, extruded films with good mechanical properties to be obtained.

Shaped articles such as mouldings of any type, sometimes with complicated structures, such as housings, spools, covers and household appliances may be produced by injection moulding.

The invention will be illustrated in more detail by the following examples.

EXAMPLE 1

114.15 g (0.500 mol) bisphenol A 113.54 g (0.530 mol) diphenylcarbonate and 0.2 mol % PE 3a-OH (4.6 free OH groups per mol), based on bisphenol A, were weighed into a flask equipped with stirrer and Vigreux column. The apparatus was purged with nitrogen to remove atmospheric oxygen and the mixture was heated to 150° C. 0.0074 g ($4*10^{-3}$ mol %) of an adduct of 70% tetraphenyl phosphonium phenolate and 30% phenol, based on bisphenol A, were then added and the resultant phenol distilled off at 100 mbar. The temperature was simultaneously raised to 250° C. The vacuum was improved to 10 mbar after 1 hour. Polycondensation was achieved by reducing the vacuum to 0.5 mbar and raising the temperature to 300° C.

EXAMPLE 2

114.15 g (0.500 mol) bisphenol A 113.54 g (0.530 mol) diphenylcarbonate and 0.25 mol % PE 3a-OH (4.6 free OH groups per mol), based on bisphenol A, were weighed into a flask equipped with stirrer and Vigreux column. The apparatus was purged with nitrogen to remove atmospheric oxygen and the mixture was heated to 150° C. 0.0074 g ($4*10^{-3}$ mol %) of an adduct of 70% tetraphenyl phosphonium phenolate and 30% phenol, based on bisphenol A, were then added and the resultant phenol distilled off at 100 mbar. The temperature was simultaneously raised to 250° C. The vacuum was improved to 10 mbar after 1 hour. Polycondensation was achieved by reducing the vacuum to 0.5 mbar and raising the temperature to 300° C.

EXAMPLE 3

114.15 g (0.500 mol) bisphenol A 113.54 g (0.530 mol) diphenylcarbonate and 0.3 mol % PE 3a-OH (4.6 free OH groups per mol), based on bisphenol A, were weighed into a flask equipped with stirrer and Vigreux column. The apparatus was purged with nitrogen to remove atmospheric oxygen and the mixture was heated to 150° C. 0.0074 g ($4*10^{-3}$ mol %) of an adduct of 70% tetraphenyl phosphonium phenolate and 30% phenol, based on bisphenol A, were then added and the resultant phenol distilled off at 100 mbar. The temperature was simultaneously raised to 250° C. The vacuum was improved to 10 mbar after 1 hour. Polycondensation was achieved by reducing the vacuum to 0.5 mbar and raising the temperature to 300° C.

EXAMPLE 4

Comparison Example without Dendritic Branching Agent 114.15 g (0.500 mol) bisphenol A and 113.54 g (0.530 mol) diphenylcarbonate were weighed into a flask equipped with stirrer and Vigreux column. The apparatus was purged with nitrogen to remove atmospheric oxygen and the mixture was heated to 150° C. 0.0074 g ($4*10^{-3}$ mol %) of an adduct of 70% tetraphenyl phosphonium phenolate and 30% phenol, based on bisphenol A, were then added and the resultant phenol distilled off at 100 mbar. The temperature was simultaneously raised to 250° C. The vacuum was improved to 10 mbar after 1 hour. Polycondensation was achieved by reducing the vacuum to 0.5 mbar and raising the temperature to 300° C.

The physical properties of the polycarbonates obtained in the examples are set out in Table 1.

The SV value was used to identify the branching of polycarbonates. The SV value is defined as quotient of the melt viscosities at a shear rate of 10 $s^{-1}$ and $10^3$ $s^{-1}$. The higher the SV value, the greater the deviation from the Newtonian flow behaviour, i.e. the greater the pseudoplasticity.

The colour of the polycarbonates produced was determined by means of a colour value.

The relative solution viscosity ηrel* was used to identify the viscosity. It was measured at a polymer concentration of 0.5 wt. % in dichloromethane at 25° C.

TABLE 1

| Example | Branching agent | Branching agent in mol % | Phenolic OH in ppm | ηrel* (melt) | ηrel* (strand) | SV value | Colour value |
|---|---|---|---|---|---|---|---|
| 1 | PE 3a-OH | 0.2 | 260 | 1.1307 | 1.302 | 2.88 | 0.30 |
| 2 | PE 3a-OH | 0.25 | 380 | 1.316 | 1.305 | 3.68 | 0.30 |
| 3 | PE 3a-OH | 0.3 | 360 | 1.347 | 1.327 | 4.5 | 0.32 |
| 4 | — | — | 360 | 1.258 | 1.232 | 1.80 | 0.28 |

The SV values show that the polycarbonates according to the invention have excellent processibility.

What is claimed is:

1. A highly branched polycondensate comprising the product of polycondensating polycondensatable monomers in the presence of branching agents, wherein the branching agents are selected from polymers, oligomers consisting of 2 to 100 monomer units and dendritic polymers, the branching agents containing residues of monomers represented by the general formulae A—R—$B_x$ or $A_x$—R—B wherein A represents a —C(O)X group, X being hydroxyl, halogen, alkoxy or aralkoxy, each having 1 to 30 carbon atoms, B represents one of (i) an —OY group, Y being hydrogen, trialkyl silyl, alkyl or acyl, each having 1 to 30 carbon atoms, and (ii) an amino group, an ammonium halide or an alkyl carbamate having 1 to 8 carbon atoms, R is an organic aromatic, aliphatic-aromatic or aliphatic radical containing 1 to 25 carbon atoms, and x≧2.

2. The highly branched polycondensate of claim 1 wherein the polycondensate is selected from a polycarbonate, a copolycarbonate, a polyester, a polyamide, a polyester amide and a copolycondensate containing at least two of the aforementioned polymer units.

3. A process of producing a highly branched polycondensate comprising polycondensating (a) polycondensatable monomers in the presence of (b) branching agents selected from polymers, oligomers comprising 2 to 200 monomer units and dendritic polymers, the branching agents containing residues of monomers represented by the general formulae A—R—$B_x$ or $A_x$—R—B wherein A represents a —C(O)X group, X being hydroxyl, halogen, alkoxy or aralkoxy each with 1 to 30 carbon atoms, B represents one of (i) an —OY group, Y being hydrogen, trialkyl silyl, alkyl or acyl, each having 1 to 30 carbon atoms, and (ii) an amino group, an ammonium halide or an alkyl carbamate having 1 to 8 carbon atoms, and R is an organic aromatic, aliphatic-aromatic or aliphatic radical containing 1 to 30 carbon atoms, and x≧2.

4. The process of claim 3 wherein the dendritic polymeric branching agents used are prepared from monomers represented by one of formulas (I), (II), (III) and (IV),

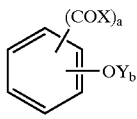
(I)

wherein X is hydroxyl, halogen, alkoxy or aralkoxy, Y is hydrogen, trialkyl silyl, alkyl or acyl having 1 to 20 carbon atoms, and provided that when a is equal to 1, $b \geqq 2$, and when $a \geqq 2$, b is equal to 1;

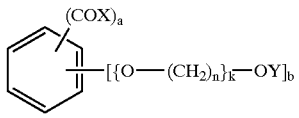
(II)

wherein X, Y, a and b are as defined above and n and k, independently of one another, is an integer from 1 to 10;

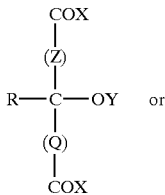
(III)

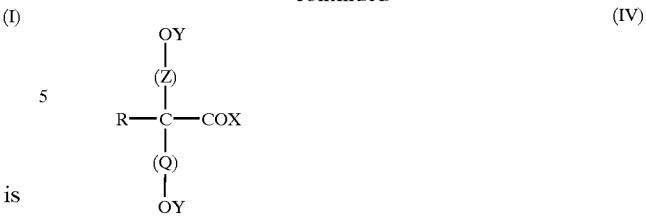
(IV)

wherein X and Y are as defined above, R is hydrogen, alkyl or aralkyl having 1 to 20 carbon atoms, and Z and Q, independently of one another, are alkyl, aryl or aralkyl each having 1 to 20 carbon atoms.

5. The process of claim 3 wherein the polycondensatable monomers (a) are a bisphenol and a carboxylic acid diester, and the dendritic polymeric branching agent (b) is present in a quantity of 0.005 to 2 wt. % based on the mass of the bisphenols.

6. The process of claim 3 wherein polymerisation takes place in at least two stages comprising,
   synthesising an oligomer from the polycondensatable monomers (a), and
   then adding the dendritic branching agent (b).

7. A method of using the highly branched polycondensates of claim 1 for producing moulded articles.

8. A moulding composition for producing moulded articles, which comprises the highly branched polycondensate of claim 1.

* * * * *